Figure 1:
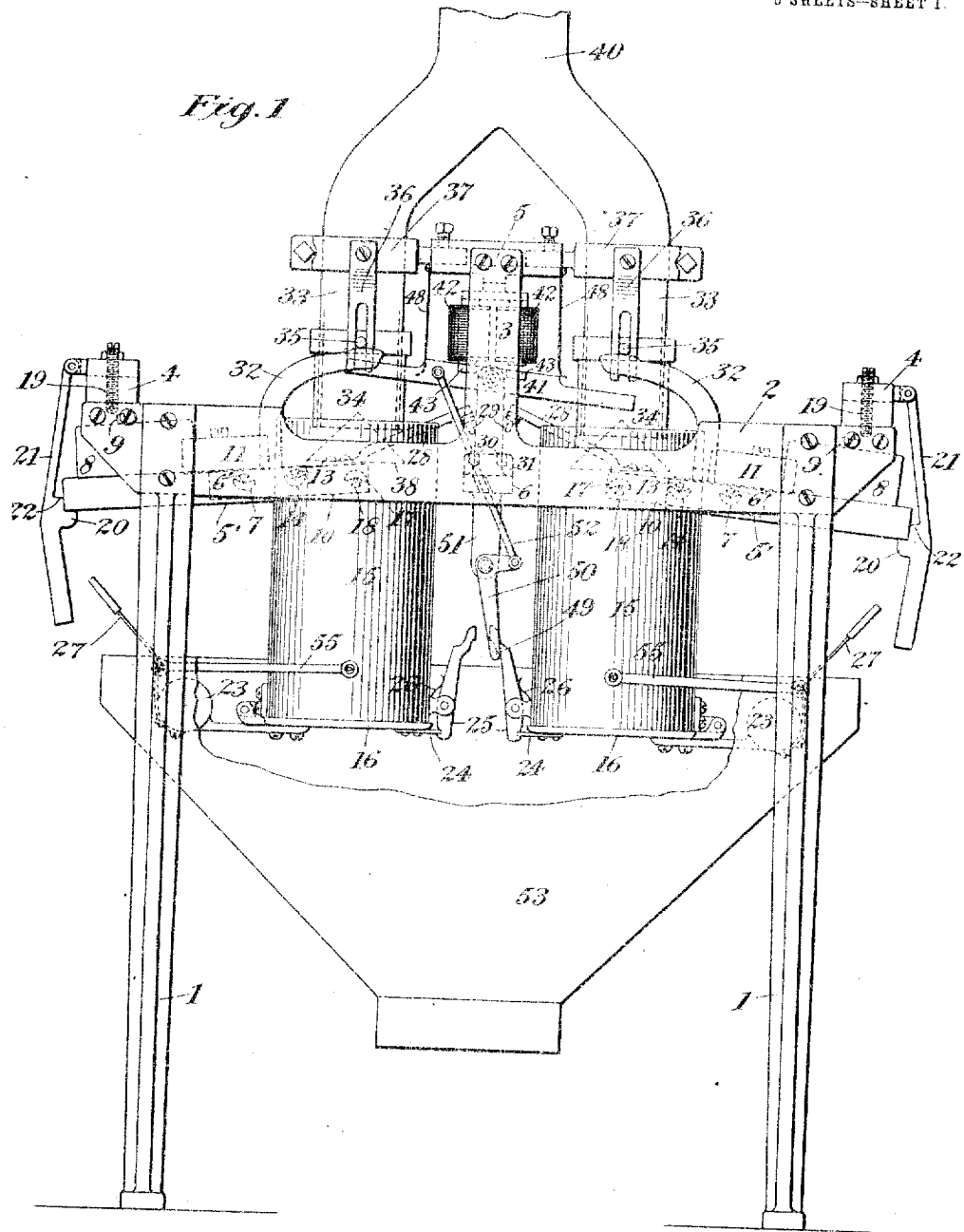

No. 832,102. PATENTED OCT. 2, 1906.
G. F. TURNER & C. E. VAIL.
AUTOMATIC WEIGHING MACHINE.
APPLICATION FILED DEC. 17, 1904.

5 SHEETS—SHEET 1.

Witnesses:
Chas. H. King
R. Champlin

Inventors:
George F. Turner
and Charles E. Vail
by R. Champlin
Atty.

No. 832,102. PATENTED OCT. 2, 1906.
G. F. TURNER & C. E. VAIL.
AUTOMATIC WEIGHING MACHINE.
APPLICATION FILED DEC. 17, 1904.

5 SHEETS—SHEET 4.

Witnesses.
Chas. W. King
R. Champion

Inventors:
George F. Turner
and Charles E. Vail,
by W. W. Thompson
Atty.

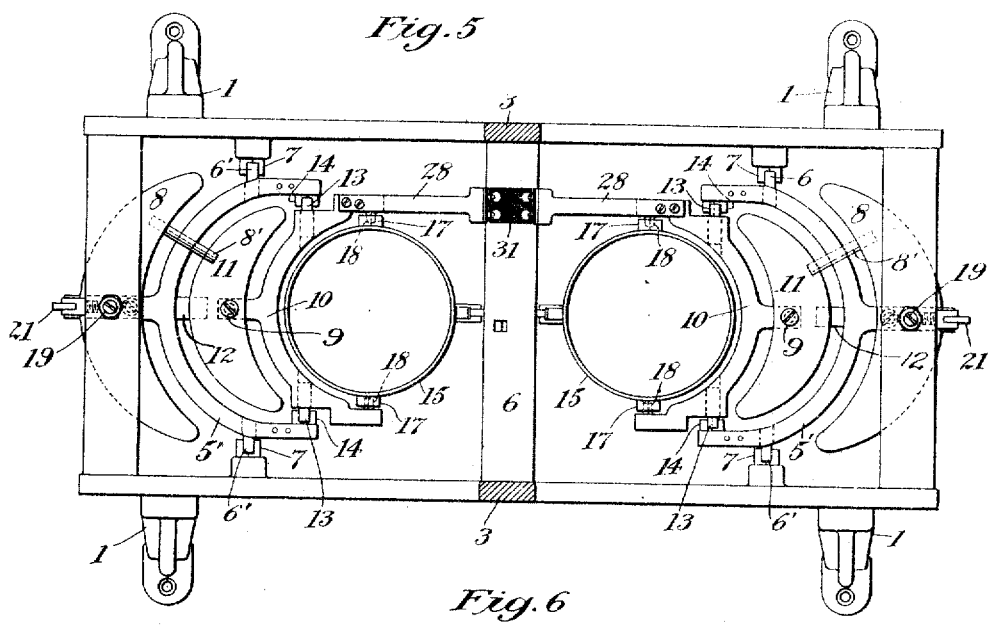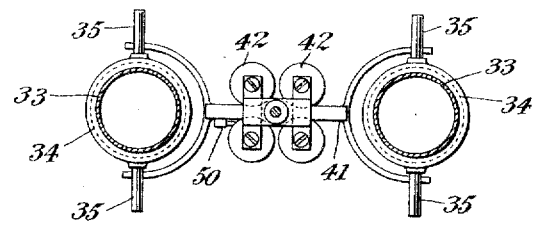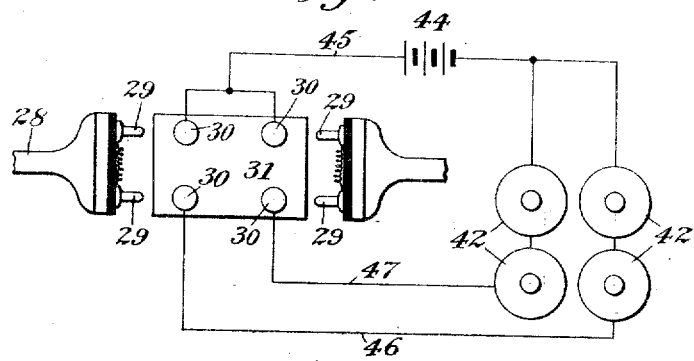

UNITED STATES PATENT OFFICE.

GEORGE F. TURNER, OF BROOKLYN, AND CHARLES E. VAIL, OF NEW YORK, N. Y.

AUTOMATIC WEIGHING-MACHINE

No. 832,102.

Specification of Letters Patent.

Patented Oct. 2, 1906.

Application filed December 17, 1904. Serial No. 237,197.

*To all whom it may concern:*

Be it known that we, GEORGE F. TURNER, a resident of Brooklyn, Kings county, and CHARLES E. VAIL, a resident of New York, county of New York, State of New York, citizens of the United States, have invented certain new and useful Improvements in Automatic Weighing-Machines, of which the following is a specification.

This invention relates to automatic weighing-machines of that class adapted for weighing predetermined loads; and the principal objects of the invention are to reduce to a minimum those factors which ordinarily impair the accuracy of the weighing operation and to reduce the time required by the mechanism for making up and poising the predetermined load. In weighing-machines of this type as heretofore constructed it has been customary to feed to a load-receiver or bucket first a main stream for making up somewhat rapidly the major portion of the load and afterward a drip-stream for supplying more slowly the small amount required for bringing the total load to a poise. In one type of such machines both the main stream and the drip-stream have been fed from a single source or spout and have been controlled by one or more devices, such as valves, for regulating the flow. In another type the main stream has been delivered from one source or spout and the drip-stream from another. In both, however, the movement of a single counterpoised scale-beam has controlled the shutting off of the main stream and the drip-stream, and in both the load-receiver has been mounted upon a scale-beam having a considerable range of movement during the delivery of the load and the weight and momentum of the load and the impact of the material falling thereon have all been exerted upon the beam and transmitted thereto throughout the entire period of delivery of the load up to the moment of cut-off of the drip-stream. In all of these scales, so far as we are aware, the scale-beam has been brought to a horizontal or poising position by the drip-supply and considerable time has been required to bring the scale-beam to this position and carry it beyond the poising-line, owing to the small size of the drip-stream supplied to the load-receiver. In most of these machines, also, the reduction or cut-off of the stream supplied to the load receiver has been dependent upon the operation of parts resting upon the scale-beam and deriving their movements from the poising movement of such beam. In the present construction these factors which tend to impair the accuracy of the weighing operation have been materially reduced. One of the principal means for accomplishing this result is the mechanism employed for supporting the load-receiver, and another is the mechanical isolation of the stream-controller or cut-off valve from the beam mechanism during the completion of a load.

The principal feature of the weighing mechanism proper which distinguishes the present weighing-machine from those heretofore used is the employment of a pair of counterpoised scale-beams, one of which constitutes the main scale-beam and is pivoted on a suitable support, while the other, which is herein termed the "auxiliary" scale-beam, is pivoted on the poising side of the main scale-beam, supports the load-receiver, and has a movement relative to that of the main scale-beam for poising the whole load supplied to the load-receiver. The main scale-beam and the auxiliary scale-beam are so counterpoised as to permit both beams and the load-receiver to move in unison during the last moments of the delivery of the main stream for the purpose of poising the main supply; but after the main supply has been poised the momentum of the main scale-beam is checked, and it preferably has no further movement, but is locked in its poised position, which is substantially the horizontal, and the poising of the total load, made by adding to the main supply a suitable drip-supply, is effected by a comparatively small poising movement of the auxiliary scale-beam relative to the main-beam, which movement is preferably from a horizontal position. These poising movements of the main scale-beam and the auxiliary scale-beam are utilized in this construction to control, respectively, the cutting off of the main supply and of the drip-supply, the latter of these functions being preferably governed electrically in order that the auxiliary scale-beam may be entirely clear of the stream-controlling means at the moment of poising of the total load.

Another important feature of this invention is an improved type of stream-controlling means for permitting the rapid delivery and effecting the rapid cut-off of the stream of material delivered to the load-receiver. We have found that a stream-controller or cut-off device may be made to operate positively and rapidly if it is permitted to gravitate in the direction of the flow of the stream for effecting the cut-off of the same, and the best results have been obtained by employing stream supplying and controlling means having coacting cut-off faces one of which forms a hollow supply-stream and is preferably circular. The preferred means employed for this purpose are a supply-spout and a coacting tubular cut-off member which moves relatively thereto and forms therewith a supply-stream which is hollow and is delivered evenly to the load-receiver at all points in a path corresponding to the outline of the hollow supply-stream. A single tubular cut-off member is preferably employed for delivering and cutting off both a main stream and a drip-stream, and the two cut-off movements thereof are controlled in this case by the main scale-beam and the auxiliary scale-beam, respectively.

We prefer to embody all of the various features of construction hereinbefore set forth, in a duplex automatic weighing-machine in which the cut-off of the drip-stream from one load-receiver is synchronous with the delivery of a drip-stream to another load-receiver, and this is the type of machine illustrated as embodying our invention in the accompanying drawings, in which—

Figure 2:
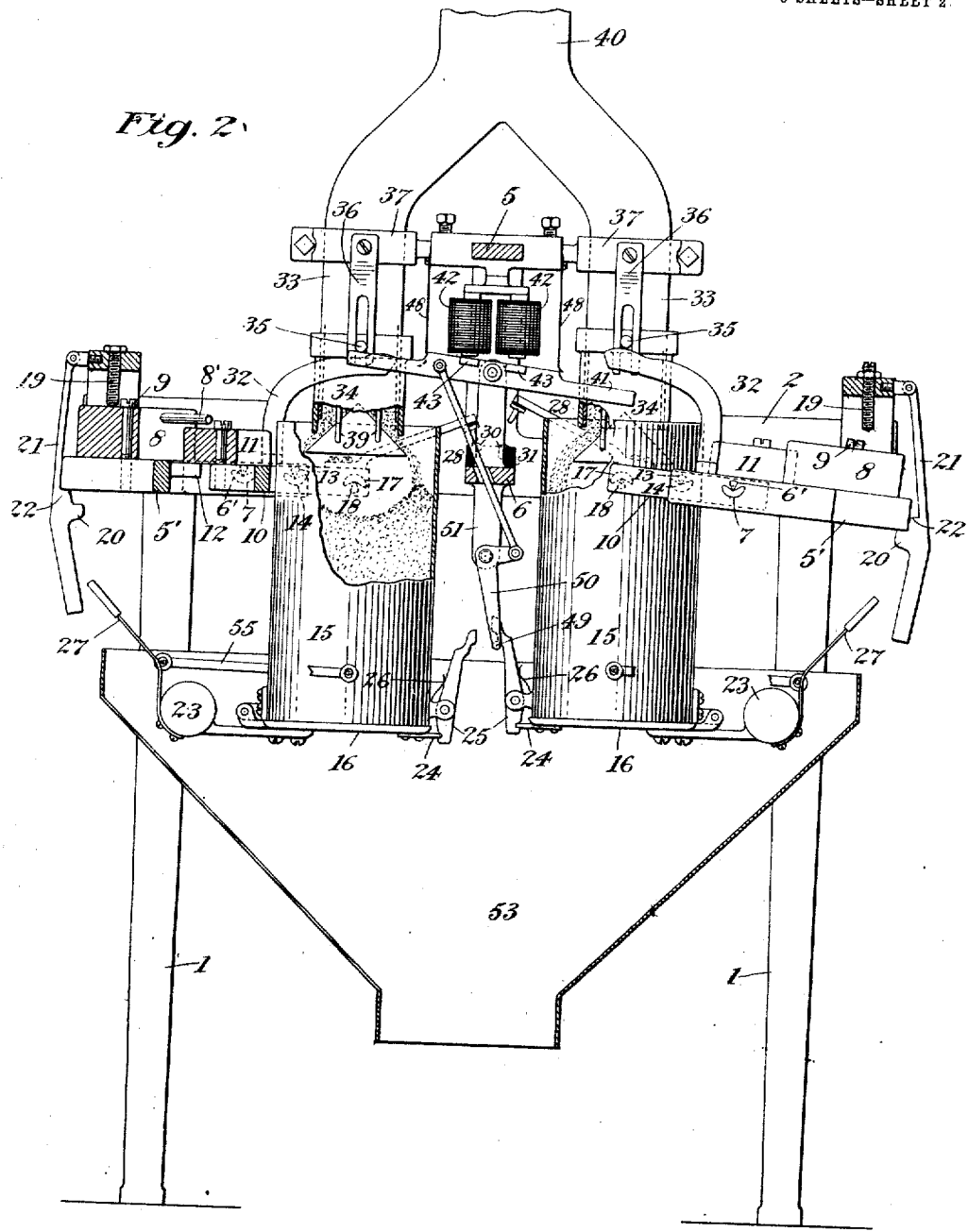
Figure 3:
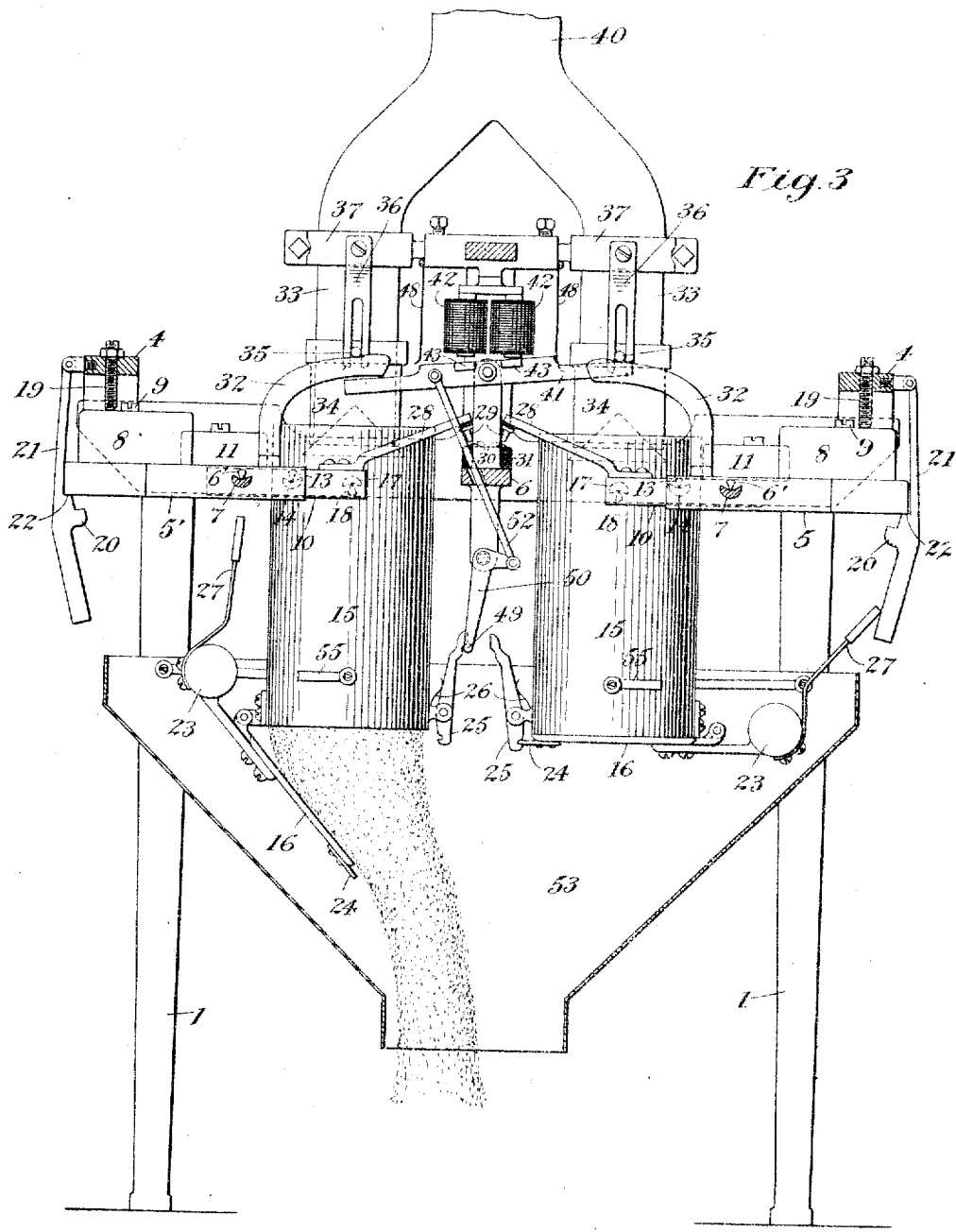
Figure 4:
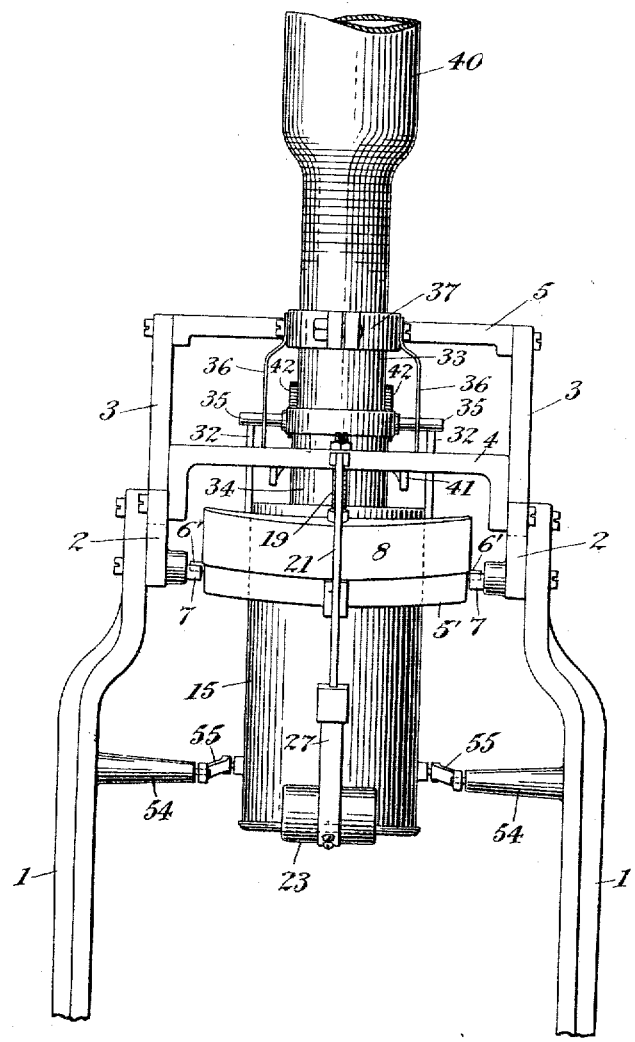

Figure 1 is a front elevation of such a duplex automatic weighing-machine, showing the positions of the parts when no material is being delivered to either load-receiver. Fig. 2 is a similar view, partly in section, showing the positions of the parts with one of the main scale-beams locked in its poised position and a drip-stream being delivered to the load-receiver carried by such beam and a main supply being delivered to the load-receiver carried by the other main scale-beam. Fig. 3 is a similar view showing the positions of the parts with the first load fully made up being discharged from its receiver and the second load being completed by the addition of a drip-supply to the main supply in the second load-receiver. Fig. 4 is an end elevation of said machine with the discharge-hopper removed. Fig. 5 is a plan of the machine, partly in section, with the parts in positions corresponding to those shown in Fig. 3. Fig. 6 is a detail showing in sectional plan the main mechanical and electrical elements of the stream-controlling means common to both load-receivers. Fig. 7 is a diagrammatic view illustrating the electric circuits of the stream-controlling means.

Similar characters designate like parts in all the figures of the drawings.

Any suitable means may be employed for supporting the several operative parts of the duplex automatic weighing-machine illustrated in the accompanying drawings. That shown embodies as its principal elements supports or legs 1, which at their upper ends have secured thereto a pair of side frames 2. From the centers of the side frames 2 rise short standards or posts 3. Suitable end pieces or cross-bars 4 and center pieces or cross-bars 5 and 6 are employed for connecting and stiffening the side frames 2 and for supporting various operating parts of the mechanism. Between the side frames 2 the scale-beams and load-receivers of each weighing mechanism of the duplex automatic weighing-machine shown are mounted for operation. As the different elements of the second weighing mechanism are preferably and as shown herein identical in construction with corresponding elements of the first weighing mechanism, only one of such mechanisms will be described in detail, and the corresponding parts of the other will be designated by similar reference characters. The main counterpoised scale-beam of each weighing mechanism will preferably be of the counterweighted type, and this main scale-beam is designated 5'. It may be supported in the well-known manner by knife-edged pivots 6', resting on V-shaped bearings 7. This beam is preferably forked at its poising side, and, as shown, (see Fig. 5,) this fork extends to the counterpoising side thereof, and the main central portion of the scale-beam at the counterpoising side of the beam carries a counterweight 8, corresponding to the weight of the main supply to be delivered to the load-receiver for making up the predetermined load. This weight is or may be adjustable in position on the main scale-beam and is held thereto in this construction by means of a screw-bolt 9. Within the forked portion of the main scale-beam an auxiliary scale-beam may be mounted so as to move normally with the main scale-beam, but having a relative movement thereon for the purpose of poising the total load after the drip-supply has been delivered to the load-receiver. This auxiliary scale-beam is designated generally by 10 and is also preferably forked at its poising side, the forked portion of this beam also extending in the construction shown to the counterpoising side thereof and the main or central arm of said auxiliary scale-beam also having secured thereto a counterweight, such as 11. The masses of the counterweights 8 and 11 and the leverages of the beams by which they are carried are such that the weight 8 will poise the main supply, which may be, say, seven-eighths of the total load, while the counterweight 11 will poise the total load. Normally the auxiliary scale-beam is supported on and moves with the main scale-beam, the outer end of the counterweight 11 resting in this construction on a stop 12 on the main scale-beam.

The auxiliary scale-beam also has knife-edged pivots 13, similar to those of the main scale-beam and resting on V-shaped bearings 14, corresponding to the bearings 7 on the side frames. By means of these devices the auxiliary scale-beam is pivoted on the poising side of the main scale-beam at the desired distance from the axis of movement of the main scale-beam. The load-receiver or bucket for holding the load to be weighed may be of any suitable type, but will preferably be a bucket the bottom of which has a swinging closer. Such a load-receiver is shown herein and is designated 15, its closer being designated by 16. This load-receiver has at opposite sides thereof and near its upper ends the usual V-shaped bearings 17, which rest on knife-edged pivots 18, carried by the auxiliary scale-beam at a suitable distance from the axis of movement of said auxiliary scale-beam.

The normal position of the auxiliary scale-beam with respect to its main scale-beam as determined by the stop 12 has been hereinbefore mentioned. The movement of said auxiliary scale-beam relative to its main scale-beam will usually be comparatively small, and a stop 8' on the main weight 8 defines the limit of its poising movement. The movements of the main scale-beam also will both be limited by suitable stops, one of which is preferably a fixed stop, such as 19, adjustable as required, this stop being adapted to determine the limit of the poising movement of the main scale-beam. The other limit of movement of the main scale-beam—to wit, the limit of its movement when in its counterpoised position—will preferably be determined by a shiftable stop, such as that shown at 20, this stop in the present construction being carried by a swinging arm 21, pivoted on the cross-bar 4 and suitably weighted at its lower end for the purpose of normally holding it in position to enable the main scale-beam to rest on one of two stop-faces carried thereby. The other of these stop-faces is shown at 22 and constitutes an element of means for latching or locking the main scale-beam in its poised position against the stop 19, in which position said main scale-beam is supported by the framework and cannot move in any direction. By referring to Fig. 2 it will be seen that the main scale-beam is locked in this position after the load-receiver carried thereby has received its main supply, and when so locked the factor of momentum, which is present in all weighing-machines in which the scale-beam descends continuously through a considerable arc of movement after the poising movement has begun, disappears so far as said main scale-beam is concerned.

The devices for holding the bucket-closer 16 in its locked position and for releasing the same are or may be substantially similar to other devices employed for the same purpose. Here the closer 16 is pivoted at the outside of the bottom of the bucket and has a counterweight 23 extending beyond said pivot for the purpose of returning the closer to its shut position after it has been opened and the contents of the load-receiver discharged. At its inner free end said closer 16 has a stop 24, adapted to be engaged by a latch 25, pivoted near the inner lower end of the bucket and normally held in engagement with said stop by means of a spring 26. At its upper end the latch 25 of the holding means for the closer is so constructed as to coöperate with and be releasable by suitable releasing or tripping means, which will be hereinafter described. The closer 16 will also preferably control the return of the main scale-beam to its normal position and through it the delivery to its load-receiver of the main supply in a manner which will be hereinafter described, the release of the main scale-beam from the stop-face 22 of the latch 21 being effected in this construction by means of a resilient tapper, such as 27, secured to the extended outer portion of the closer 16 and in a position to coact with the lower end of said latch and release it from the main scale-beam when the closer is returned to its normal position by the counterweight 23.

Suitable stream-controlling means will be employed for delivering a main stream to the load-receiver during the first part of the weighing operation, and thereby making up the main supply in said receiver, and for afterward delivering a drip-stream to said load-receiver and making up the drip-supply required to complete the load. The delivery of these main and drip supplies will be suitably governed by movements of various operating parts, the shut-off of the main stream and afterward of the drip-stream delivered to the load-receiver being governed by the differential poising movements hereinbefore described—viz., the poising movement of the main scale-beam to the position in which it is locked to the framework and the poising movement of the auxiliary scale-beam about its pivot on and relative to the main scale-beam after such main beam has been locked to the framework. This poising movement of the main beam is ordinarily much greater than the subsequent poising movement of the auxiliary scale-beam relative thereto. In order, however, that the relatively slight movement which the auxiliary scale-beam will have at its point of support for the load-receiver during the delivery of the drip-supply to said load-receiver may control with precision the point of cut-off of the drip-stream, we prefer to make use of a controlling device having a multiplied movement with respect to that of the load-receiver for the purpose of determining the moment of cut-off of the drip-stream. This controlling device will also preferably be entirely clear of the stream-controller proper or valve by means of which the size of the supply-opening is directly regulated and is here shown as an electrical contact device, the contact portion of which is carried at such a point on the auxiliary scale-beam as to have a movement several times that of the pivot of support of the load-receiver. Here the poising end of the auxiliary scale-beam has extending therefrom an arm 28, at the free end of which is a pair of electrically-connected metallic contacts 29, insulated from the arm 28. These contacts coöperate with a complementary contact device, which in this case consists of a pair of mercury-cups 30, carried by a suitable insulating-block 31, mounted on the cross-piece 6. The relatively slight movement of the auxiliary scale-beam about its pivot 13 while the main beam is in the position shown at the left in Fig. 2 is so multiplied at the contacts 29 as to assure the cut-off of the drip-stream at the exact point desired. The relative positions of the contacts may of course be adjusted properly to obtain the desired results. Owing to the fact that the main scale-beam 5 controls the delivery of and is governed by the main supply only and does not govern and is not controlled by the total load, it is not necessary to isolate the stream-controlling means and the main scale-beam mechanically during the delivery or at the moment of cut-off of the main stream. Hence we have shown herein means carried by the main scale-beam for governing the delivery and cut-off of the main stream, the means shown being a cam-arm 32, secured to said main beam and coöperating with a stream-controller the weight of which is normally borne by the main scale-beam, as is customary in automatic weighing-machines in which the valve movements for governing both the main supply and the drip-supply are regulated by a single scale-beam.

The stream supplying and controlling means which we prefer to employ in connection with the beam mechanism and coöperative parts before set forth will embody some suitable stream-controller the opening and closing movements of which for delivering and shutting off a stream of material will be governed by corresponding movements of the beam mechanism. Here a single stream-controller is movable first from a normal position, in which the flow of the stream is shut off, to a wide-open position, then to a closed position, then to a position in which it is partially open and is adapted to deliver a drip-stream, and then from such drip-supplying position to its closed position, all four of these operations being governed by suitable movements of the beam mechanism, three of such movements being in this case controlled by the scale-beams of the weighing mechanism corresponding to such stream-controller, and the other movement—viz., the shifting of the stream-controller to its partially-open position—being governed by the other weighing mechanism. The preferred type of stream-controlling means is one in which a supply-spout, such as 33, is adapted to deliver a stream of material vertically into a bucket 15 and to have that stream reduced or cut off by a pair of coacting cut-off faces, at least one of which surrounds the stream and one of which is preferably gravitative to effect such cut-off. The gravitative member is preferably a collar or sleeve, such as 34, movable lengthwise of the spout 33 and in this construction mounted on the outside thereof and having pins, such as 35, working in guides formed in forked arms 36, secured to split collars 37, carried by the upper cross-bar 5 and serving to clamp in place the supply-spout 33. The other cut-off face of the stream-controlling means is preferably fixed and is formed in this case by a conical stream-deflecting member 38, secured to the supply-spout 33, as by means of rods 39, this conical member being in the form of a baffle-plate adapted to deflect the stream away from the center of the load-receiver and toward the sides of the same, and thereby form a hollow supply-stream. This hollow supply-stream is reduced whenever the main scale-beam descends and the collar 34 moves from the position shown at the right in Fig. 2 to that shown at the left in said view. When said collar drops to the position shown at the left in Fig. 3, the stream is entirely cut off by the cut-off faces formed by the circles at the points of contact of the collar 33 and the fixed conical baffle-plate 38. Normally the pins 35, carried by the collar 34, rest on the cam-face of the cam 32, carried by the main scale-beam, and said cam-face controls the descent of the collar from its wide-open to its shut position during the delivery of the main supply. This cam also controls the shifting of said collar to its uppermost or wide-open position for delivering the main supply when the main scale-beam is returned to its normal or counterpoised position after the discharge of the load from the bucket.

It has been hereinbefore stated that the shut-off of the drip-stream delivered to a bucket is controlled by the electrical contact device carried by the auxiliary scale-beam supporting such bucket. The shifting of the stream-controller of the other load-receiver to its drip-supplying position is also preferably controlled by the same electrical contact device. Thus in this construction each of these electrical contact devices governs the shutting off of the drip-stream from its own load-receiver and the delivery of a drip-stream to the other load-receiver, the two streams of material being supplied in this case through the different branches 33 of the same main-supply spout 40. In all cases the stream-controller or collar is operative for first permitting, then shutting off, and afterward partially restoring the flow of the stream of material to its load-receiver. The particular construction of the means for accomplishing these results is not essential; but the devices herein illustrated have been found to work well in practice. The principal element of this part of the stream-controlling means is a lever 41, which is pivoted near its center in the uprights 3 and adapted to operate in a manner similar to a walking-beam, the two ends of this lever being forked, as shown clearly in Fig. 6, and lying below the pins 35, extending from the collars 34. The movements of this lever 41 are here controlled by a pair of electromagnets 42, each of which in this construction is of the duplex type. The armatures of these two electromagnets are shown at 43 and are carried by the lever 41, and said lever is oscillated first in one direction and then in the other on the energization of the corresponding magnet. The circuit of each of these magnets is a very simple one and contains only a single break adapted to be closed by the contacts 29 and 30. When the contacts 29 (shown at the left in Fig. 7) dip into their corresponding mercury-cups 30, a circuit is closed from a source of energy, such as battery 44, through a conductor 45, contacts 30 and 29, conductor 46, and the magnet 42 most remote therefrom. When the other pair of contacts 29 dip into the other mercury-cups 30, the circuit is the same from the battery to the cups 30, from which it passes by way of conductor 47 to the other magnet 42. Means, such as the spring arms or latches 48, are also provided for latching the lever 41 in its respective positions, these spring-arms being curved at their lower ends and adapted to exert considerable pressure against the inner faces of the yokes when adjacent thereto. This spring-pressure will be sufficient to hold the lever firmly in its latched position even when the pins 35 on the collar 34 are resting on one of the yokes and said collar thus supported by the lever. This spring-pressure, however, is inferior to the power of the magnet 42, and when either magnet is energized the lever will be quickly released from the arm 48, by which it is latched, and will be shifted to the opposite position, in which it will be latched by the other spring-arm 48.

In order that the operations of the various coöperative parts of the duplex automatic weighing-machine shown may be properly timed, we prefer to control the means for discharging the completed loads from the stream-controlling mechanism just described. Here a trip or releasing device is employed, which is common to both load-receivers and is shiftable into operative relation therewith separately, it being in this case shifted first into operative relation with the latch or holding device of one load-receiver and then out of operative relation with such holding device and into operative relation with the holding device of the other load-receiver. The releasing or tripping device shown is a stop 49, projecting rearwardly from the lower end of the long arm of an angle-lever 50, pivoted upon a depending arm 51 of the framework, the short arm of this angle-lever being joined in this case by a connecting-rod 52 to the lever 41 at a point at the opposite side of the vertical line connecting the pivots of said levers 41 and 50.

In connection with the mechanism hereinbefore described a discharge-hopper, such as 53, may be employed, which hopper is suitably supported on the framework, as by means of the studs 54, projecting inwardly from the legs 1. These studs and the buckets are also joined by suitable connecting means for preventing undue swinging or swaying movements of the bucket during the weighing operation, the means shown being connecting-links 55, having at their ends V-shaped bearings coacting with knife-edge pivots on the buckets and said posts, respectively, for the purpose of reducing friction at these points of connection. This hopper 53 serves in a well-known manner to delay slightly the return of each closer to its normal position and to render such return impossible unless the hopper is empty. This hopper and the closer coöperate in such a manner that the hopper also controls the opening of the supply-spout for the making up of a new load, the closer being provided with a resilient tapper, which will be hereinafter more fully described and which controls the opening of said supply-spout, but is ineffective for such purpose until the hopper is empty.

The operation of a duplex automatic weighing-machine adapted for weighing predetermined loads and illustrating one embodiment of the invention disclosed in this application is as follows: Assuming that the parts are in their normal positions (shown in Fig. 1) a stream of material will be permitted to flow through the supply-spout 40 and its branches 33. The flow of this stream will usually be cut off by means of a sliding gate (not shown) located at some point in the supply-spout above the collar 34. The stream thus turned on will flow into the left-hand bucket until the delivery of the main supply is completed, by which time the main scale-beam at the left will have moved to the limit of its poising swing and will have been locked against the stop 19 by the latch-face 22 of the member 21, the weight of the lower end of this member being sufficient to shift it under the outer end of said main beam the moment said beam rides above the connecting-face between the stops 20 and 22. During this time the main supply is being delivered to the other load-receiver at the right-hand side of the machine; but as soon as its main supply is completed the flow of material to the right-hand bucket will be completely shut off, owing to the fact that the right-hand end of the lever 41 is down, and the right-hand collar 34 may descend with the coacting cam 32 and main scale-beam to its shut-off position. The left-hand end of the lever 41 is, however, elevated, and hence the left-hand collar 34 can descend only to its partial open or drip-supplying position, (see Fig. 2,) in which position it will be supported by the pins 35, resting on the arms of the yoke at the left-hand end of the lever 41. The drip-stream will continue to be delivered to the left-hand bucket until the weight of the main supply, plus that of the drip-supply, poises the left-hand auxiliary scale-beam, when said auxiliary beam will move relatively to its main beam, and its load-receiver will descend again and move a short distance farther, when the left-hand contacts 29 will dip into the mercury-cups 30 and a circuit will be instantly closed through the right-hand magnet 42, whereupon the lever 41 will be instantly shifted to the opposite position (shown in Fig. 3) and latched therein, the left-hand collar 34 dropping as the lever is shifted and instantly shutting off the drip-stream. At the same time the right-hand collar is elevated by the right-hand yoke of the lever 41 to its partially-open or drip-supplying position, as shown at the right in Fig. 3, and the drip-supply of the second load-receiver begins to flow into said receiver. At the same time also that the lever 41 is shifted the connections between it and the releasing device 49 shift this releasing device into the path of the upper end of the latch 25, which is instantly tripped and the closer opened by the weight of the load. The moment the left-hand load-receiver begins to discharge its contents, as shown in Fig. 3, its auxiliary scale-beam returns to its normal horizontal counterpoised position, and its contacts 29 are withdrawn from the mercury-cups 30. The main scale-beam, however, remains locked in its horizontal position until the contents of the first bucket are discharged therefrom and are nearly discharged from the hopper 53, whereupon the counterweight 23 becomes effective to return the closer to its normal shut position, in which it will be fastened again by the latch 25 and the stop 24. Just after the closer is latched shut, however, the resilient tapper 27 strikes the lower end of the arm 21 a hard blow and knocks the latch 22 away from the left-hand main beam, whereupon said beam returns to its normal position and its cam 32 raises its collar 34 again, and the delivery of the main supply begins again for the making of a new load. As soon as such main supply is made up in the left-hand bucket the supply will be completely shut off, because the left-hand end of the lever 41 will not then be in a position to support said collar, and the collar will move, with its cam, to the limit of its downward movement. The raising of said collar for the delivery of a drip-stream will not take place until the lever 41 is shifted back again to the position shown in Fig. 2 by the right-hand contacts dipping into their mercury-cups 30 and energizing the left-hand electromagnet 42, when the operation before described will be repeated, as one bucket and then the other completes and discharges its load, until the supply of material is entirely cut off above the collars or is exhausted.

What we claim is —

1. An automatic weighing apparatus embodying the following coöperative elements, viz., stream-supplying means embodying a stream-controlling member movable to a cut-off position and also movable to two different stream-supplying positions one of which determines the flow of the main supply and the other of which determines the flow of the drip-supply; automatic means for shifting said stream-controlling member to its respective stream supplying and cut-off positions, said means including a counterpoised main scale-beam, a counterpoised auxiliary scale-beam pivoted on the poising side of said main scale-beam, a normally open electric circuit, and means controlled by the closure of said circuit for governing said cut-off movement; and a load-receiver pivoted on the poising side of said auxiliary scale-beam.

2. An automatic weighing apparatus embodying the following coöperative elements, viz., a stream-controlling member movable to a cut-off position and also movable to two different stream-supplying positions one of which determines the flow of the main supply and the other of which determines the flow of the drip-supply; automatic means for shifting said stream-controlling member to its respective stream-supplying and cut-off positions, said means including a counterpoised main scale-beam adapted to be poised by the main supply, a counterpoised auxiliary scale-beam pivoted on the poising side of said main scale-beam and adapted to have a poising movement relative to said main scale-beam which movement is controlled only by the drip-supply, a normally open electric circuit, and means controlled by the closure of said circuit for governing said cut-off movement; and a load-receiver pivoted on the poising side of said auxiliary scale-beam.

3. An automatic weighing apparatus embodying the following coöperative elements, viz., a stream-controlling member movable to a cut-off position and also movable to two different stream-supplying positions one of which determines the flow of the main supply and the other of which determines the flow of the drip-supply; automatic means for shifting said stream-controlling member to its respective stream-supplying and cut-off positions, said means including a counterpoised main scale-beam adapted to be poised by the main supply, a counterpoised auxiliary scale-beam pivoted on the poising side of said main scale-beam and adapted to have a poising movement relative to said main scale-beam which movement is controlled only by the drip-supply, a normally open electric circuit, and means controlled by the closure of said circuit for governing said cut-off movement, and is relatively small as compared with the poising movement of the main scale-beam; and a load-receiver pivoted on the poising side of said auxiliary scale-beam.

4. An automatic weighing apparatus embodying the following coöperative elements, viz., stream-supplying means embodying a stream-controlling member movable to a cut-off position by power independent of that developed by the load and also movable to two different stream-supplying positions one of which determines the flow of the main supply and the other of which determines the flow of the drip-supply; automatic means for shifting said stream-controlling member to its respective stream-supplying positions and for controlling the shifting of the same to its cut-off position, said means including a counterpoised main scale-beam, a counterpoised auxiliary scale-beam pivoted on the poising side of said main scale-beam, a normally open electric circuit, and means controlled by the closure of said circuit for governing said cut-off movement; and a load-receiver pivoted on the poising side of said auxiliary scale-beam.

5. An automatic weighing-machine embodying the following coöperative elements, viz., stream-supplying means for first delivering a main supply and shutting off the same and afterward delivering a drip-supply, a counterpoised main scale-beam adapted to be poised by the main supply, a counterpoised auxiliary scale-beam pivoted on the poising side of said main scale-beam and adapted to be poised by the total supply, means governed by the main scale-beam for moving the stream-supplying means into position to first deliver the main supply and afterward shut off the stream, independent means for moving the stream-supplying means into position for delivering the drip-supply, means for shutting off the drip-stream, and a load-receiver pivoted on the poising side of said auxiliary scale-beam.

6. An automatic weighing-machine embodying the following coöperative elements, viz., stream-supplying means for first delivering a main supply and shutting off the same and afterward delivering a drip-supply, a counterweighted main scale-beam adapted to be poised by the main supply, a counterweighted auxiliary scale-beam pivoted on the poising side of said main scale-beam and adapted to be poised by the total supply, means governed by the main scale-beam for moving the stream-supplying means into position to first deliver the main supply and afterward shut off the stream, independent means for moving the stream-supplying means into position for delivering the drip-supply, means for shutting off the drip-stream, and a load-receiver pivoted on the poising side of said auxiliary scale-beam.

7. An automatic weighing-machine embodying the following coöperative elements, viz., stream-supplying means for first delivering a main supply and shutting off the same and afterward delivering a drip-supply, a counterpoised main scale-beam adapted to be poised by the main supply, a stop for limiting the poising movement of said main scale-beam, a counterpoised auxiliary scale-beam pivoted on the poising side of said main scale-beam and adapted to be poised by the total supply after the main scale-beam reaches the limit of its poising movement, means governed by the main scale-beam for moving the stream-supplying means into position to first deliver the main supply and afterward shut off the stream, independent means for moving the stream-supplying means into position for delivering the drip-supply, means for shutting off the drip-stream, and a load-receiver pivoted on the poising side of said auxiliary scale-beam.

8. An automatic weighing-machine embodying the following coöperative elements, viz., stream-supplying means for first delivering and shutting off a main supply and afterward delivering and shutting off a drip-supply, a counterpoised main scale-beam adapted to be poised by the main supply, a counterpoised auxiliary scale-beam pivoted on the poising side of said main scale-beam and having a poising movement which is controlled by the total supply and which controls the shutting off of the drip-supply, means governed by the main scale-beam for moving the stream-supplying means into position to first deliver the main supply and afterward shut off the same, independent means for moving the stream-supplying means into position for delivering the drip-supply, means governed by the auxiliary scale-beam for moving said stream-supplying means to shut off the drip-supply, and a load-receiver pivoted on the poising side of said auxiliary scale-beam.

9. An automatic weighing-machine embodying the following coöperative elements, viz., automatic stream-controlling means for first permitting, then shutting off, and afterward partially restoring, the flow of a stream of material, a load-receiver in the path of said stream and operated by the material thereof, and a counterpoised scale-beam carrying said load-receiver and the poising movement of which controls said shutting off of the stream.

10. An automatic weighing-machine embodying the following coöperative elements, viz., automatic stream-controlling means for first permitting, then shutting off, and afterward partially restoring, the flow of a stream of material, a counterpoised main scale-beam, a counterpoised auxiliary scale-beam pivoted on the poising side of said main scale-beam, and a load-receiver pivoted on the poising side of said auxiliary scale-beam and located in the path of said stream and operated by the material thereof.

11. An automatic weighing-machine embodying the following coöperative elements, viz., automatic stream-controlling means for first permitting, then shutting off, and afterward partially restoring, the flow of a stream of material, a counterpoised main scale-beam controlling said shutting off of the stream, a counterpoised auxiliary scale-beam pivoted on the poising side of said main scale-beam, and a load-receiver pivoted on the poising side of said auxiliary scale-beam.

12. An automatic weighing-machine embodying the following coöperative elements, viz., automatic stream-controlling means for first permitting, then shutting off, and afterward partially restoring, the flow of a stream of material, a counterpoised main scale-beam controlling said first flow of the stream and also the shutting off of the same, a counterpoised auxiliary scale-beam pivoted on the poising side of said main scale-beam, and a load-receiver pivoted on the poising side of said auxiliary scale-beam.

13. An automatic weighing-machine embodying the following coöperative elements, viz., a stream-controlling member for first permitting, then shutting off, and afterward partially restoring, the flow of a stream of material, means for automatically operating said stream-controlling member to thus regulate the flow and shutting off of said stream said means including a counterpoised scale-beam normally supporting said stream-controlling member and having a poising movement controlling the said shutting off of the stream, and a load-receiver.

14. An automatic weighing-machine embodying the following coöperative elements, viz., a stream-controlling member for first permitting, then shutting off, and afterward partially restoring, the flow of a stream of material, means for automatically operating said stream-controlling member to thus regulate the flow and shutting off of said stream said means including a counterpoised main scale-beam normally supporting said stream-controlling member and having a poising movement controlling said shutting off of the stream, a counterpoised auxiliary scale-beam pivoted on the poising side of said main scale-beam, and a load-receiver pivoted on the poising side of said auxiliary scale-beam.

15. A duplex automatic weighing-machine embodying the following coöperative elements, viz., a pair of load-receivers, and a pair of automatic stream-controlling devices each of which has a stream-controlling movement that governs the flow of a stream of material to its own load-receiver and is positively governed directly by a movement of the other load-receiver.

16. A duplex automatic weighing-machine embodying the following coöperative elements, viz., a pair of load-receivers, a pair of stream-controlling devices each operative for delivering first a main supply and afterward a drip-supply and for shutting off said main and drip supplies, and means for governing the delivery of each drip-supply to its respective load-receiver by a movement of the other load-receiver.

17. A duplex automatic weighing-machine embodying the following coöperative elements, viz., a pair of load-receivers, a pair of stream-controlling devices each operative for first permitting, then shutting off, and afterward partially restoring, and means for governing the flow of a stream of material and for afterward shutting off said partial flow, such partial flow of each stream into its respective load-receiver being governed by a movement of the other load-receiver.

18. A duplex automatic weighing-machine embodying the following coöperative elements, viz., a pair of counterpoised main scale-beams, a pair of counterpoised auxiliary scale-beams each pivoted on the poising side of its respective main scale-beam, a pair of load-receivers each pivoted on the poising side of its respective auxiliary scale-beam, a pair of stream-controlling devices one for each load-receiver, each of which devices has a stream-controlling movement that governs the flow of a stream of material to its own load-receiver and means for governing each of such stream-controlling movements by a movement of the other load-receiver.

19. A duplex automatic weighing-machine embodying the following coöperative elements, viz., a pair of counterpoised main scale-beams, a pair of counterpoised auxiliary scale-beams each pivoted on the poising side of its respective main scale-beam, a pair of load-receivers each pivoted on the poising side of its respective auxiliary scale-beam, a pair of stream-controlling devices one for each load-receiver each of which devices is operative for delivering first a main supply and afterward a drip-supply, means for governing the delivery of each main supply to its load-receiver, and means for effecting the delivery of each drip-supply to its respective load-receiver by a movement of the other load-receiver.

20. A duplex automatic weighing-machine embodying the following coöperative elements, viz., a pair of counterpoised main scale-beams, a pair of counterpoised auxiliary scale-beams each pivoted on the poising side of its respective main scale-beam, a pair of load-receivers each pivoted on the poising side of its respective auxiliary scale-beam, a pair of stream-controlling devices one for each load-receiver each of which devices is operative for first permitting, then shutting off, and afterward partially restoring, the flow of a stream of material, means for governing said first two movements of each stream-controlling device, and means for effecting such partial flow of each stream into its respective load-receiver by a movement of the other load-receiver.

21. A duplex automatic weighing-machine embodying the following coöperative elements, viz., a pair of counterpoised main scale-beams, a pair of counterpoised auxiliary scale-beams each pivoted on the poising side of its respective main scale-beam, a pair of load-receivers each pivoted on the poising side of its respective auxiliary scale-beam, a pair of stream-controlling devices one for each load-receiver each of which devices is operative for first permitting, then shutting off, and afterward partially restoring, the flow of a stream of material, means for governing said first two movements of each stream-controlling device, and means for effecting such partial flow of each stream into its respective load-receiver by the poising movement of the auxiliary scale-beam of the other load-receiver relative to its main scale-beam.

22. An automatic weighing-machine embodying the following coöperative elements, viz., a load-receiver, and automatic stream-controlling means for first permitting, then shutting off, and afterward partially restoring, the flow of a stream of material to said load-receiver, said stream-controlling means including electrically-controlled means for shutting off such partial flow of the stream.

23. An automatic weighing-machine embodying the following coöperative elements, viz., automatic stream-controlling means for delivering a main supply and a drip-supply, and for shutting off both of said supplies, said means including a single stream-controlling member governing the main supply and the drip-supply and also including electrically-controlled means for shutting off said drip-supply, a counterpoised main scale-beam adapted to be poised by the main supply, a counterpoised auxiliary scale-beam pivoted on the poising side of said main scale-beam and adapted to be poised by the total supply, and a load-receiver pivoted on the poising side of said auxiliary scale-beam.

24. An automatic weighing-machine embodying the following coöperative elements, viz., a counterpoised main scale-beam adapted to be poised by the main supply, a counterpoised auxiliary scale-beam pivoted on the poising side of said main scale-beam and adapted to be poised by the total supply, a load-receiver pivoted on the poising side of said auxiliary scale-beam, and stream-controlling means for delivering a main supply and a drip-supply and for shutting off both of said supplies, said means including a single stream-controlling member governing the main supply and the drip-supply and also including electrically-controlled means governed by the poising movement of the auxiliary scale-beam relative to the main scale-beam for shutting off said drip-supply.

25. An automatic weighing-machine embodying the following coöperative elements, viz., stream-supplying means, a stream-controlling member having stream reducing, cut-off and opening movements, a load-receiver, and electrically-controlled means for imparting said cut-off movement to said stream-controlling member, said means including a contact element having a multiplied movement during the poising of the load-receiver as compared with such poising movement.

26. An automatic weighing-machine embodying the following coöperative elements, viz., stream-supplying means for delivering a main supply and a drip-supply, a stream-controlling member having stream reducing and cut-off movements, a counterpoised main scale-beam adapted to be poised by the main supply, a counterpoised auxiliary scale-beam pivoted on the poising side of said main scale-beam and adapted to be poised by the drip-supply, a load-receiver pivoted on the poising side of said auxiliary scale-beam, and electrically-controlled means for imparting said cut-off movement to said stream-controlling member, said means including a contact element movable with the auxiliary scale-beam and having at its contact-point a multiplied movement during the poising of said beam as compared with the movement of the load-receiver during such period.

27. A duplex automatic weighing-machine embodying the following coöperative elements, viz., a pair of scale-beams, a pair of load-receivers, a pair of stream-controlling valves one for each load-receiver, and a pair of electrical controlling devices one for each load-receiver and each governing a movement of the stream-controlling valve of the other load-receiver carried respectively thereby.

28. A duplex automatic weighing-machine embodying the following coöperative elements, viz., a pair of scale-beams, a pair of load-receivers carried respectively thereby, a pair of stream-controlling valves one for each load-receiver, and a pair of electrical controlling devices movable respectively with said respective load-receivers and each governing a movement of the stream-controlling valve of the other load-receiver.

29. A duplex automatic weighing-machine embodying the following coöperative elements, viz., a pair of scale-beams, a pair of load-receivers carried respectively by said scale-beams, a pair of stream-controlling valves one for each load-receiver, and a pair of electrical controlling devices having circuit-closers carried respectively by said scale-beams and each governing a movement of the stream-controlling valve of the load-receiver carried by the other scale-beam.

30. A duplex automatic weighing-machine embodying the following coöperative elements, viz., a pair of scale-beams, a pair of load-receivers carried respectively thereby, a pair of stream-controlling valves one for each load-receiver, and a pair of electrical controlling devices one for each load-receiver and each governing a movement of the stream-controlling valve of the other load-receiver and each also governing the shutting off of the supply to its own load-receiver.

31. A duplex automatic weighing-machine embodying the following coöperative elements, viz., a pair of scale-beams, a pair of load-receivers carried respectively by said scale-beams, a pair of stream-controlling valves one for each load-receiver, and a pair of electrical controlling devices having circuit-closers carried respectively by said scale-beams and each governing a movement of the stream-controlling valve of the load-receiver carried by the other scale-beam and each also governing the shutting off of the supply to its own load-receiver.

32. A duplex automatic weighing-machine embodying the following coöperative elements, viz., a pair of scale-beams, a pair of load-receivers carried thereby, a pair of stream-controlling devices each operative for delivering first a main supply and afterward a drip-supply to its respective load-receiver, means for governing the delivery and shutting off of a main supply by each of said stream-controlling devices, and a pair of electrical controlling devices one for each load-receiver and each governing the drip-supplying movement of the stream-controlling device of the other load-receiver.

33. A duplex automatic weighing-machine embodying the following coöperative elements, viz., a pair of scale-beams, a pair of load-receivers carried thereby, a pair of stream-controlling devices each operative for delivering first a main supply and afterward a drip-supply to its respective load-receiver, means for governing the delivery and shutting off of a main supply by each of said stream-controlling devices, and a pair of electrical controlling devices one for each load-receiver and each governing the drip-supplying movement of the stream-controlling device of the other load-receiver and each also governing the drip-shutting-off movement of the stream-supplying device of its own load-receiver.

34. A duplex automatic weighing-machine embodying the following coöperative elements, viz., a pair of scale-beams, a pair of load-receivers carried thereby, a pair of stream-supplying devices each operative for first permitting, then shutting off, and afterward partially restoring, the flow of a stream of material to its respective load-receiver, means for governing said first two movements of each stream-supplying device, and a pair of electrical controlling devices one for each load-receiver and each governing such last-mentioned movement of the stream-controlling device of the other load-receiver.

35. A duplex automatic weighing-machine embodying the following coöperative elements, viz., a pair of counterpoised main scale-beams, a pair of counterpoised auxiliary scale-beams each pivoted on the poising side of its respective main scale-beam, a pair of load-receivers each pivoted on the poising side of its respective auxiliary scale-beam, a pair of stream-controlling devices one for each load-receiver each of which devices has a stream-controlling movement that governs the flow of a stream of material to its own load-receiver, and a pair of electrical controlling devices one for each load-receiver and each governing said movement of the stream-controlling device of the other load-receiver.

36. A duplex automatic weighing-machine embodying the following coöperative elements, viz., a pair of counterpoised main scale-beams, a pair of counterpoised auxiliary scale-beams each pivoted on the poising side of its respective main scale-beam, a pair of load-receivers each pivoted on the poising side of its respective auxiliary scale-beam, a pair of stream-controlling devices one for each load-receiver each of which devices is operative for delivering first a main supply and afterward a drip-supply to its respective load-receiver, means for governing said first movement of each stream-controlling device, and a pair of electrical controlling devices one for each load-receiver and each governing said drip-supplying movement of the stream-controlling device of the other load-receiver.

37. A duplex automatic weighing-machine embodying the following coöperative elements, viz., a pair of counterpoised main scale-beams, a pair of counterpoised auxiliary scale-beams each pivoted on the poising side of its respective main scale-beam, a pair of load-receivers each pivoted on the poising side of its respective auxiliary scale-beam, a pair of stream-controlling devices one for each load-receiver each of which devices is operative for first permitting, then shutting off, and afterward partially restoring, the flow of a stream of material to its respective load-receiver, means for governing said first two movements of each stream-controlling device, and a pair of electrical controlling devices one for each load-receiver and each governing said last-mentioned movement of the stream-controlling device of the other load-receiver.

38. An automatic weighing-machine embodying the following coöperative elements, viz., a scale-beam, a load-receiver, stream-controlling means having two opening movements controlling respectively a main supply and a drip-supply and separated by a closing movement, means for imparting to said stream-controlling means one of said opening movements, and independent means for imparting to said stream-controlling means the other of said opening movements and for shutting off the drip-supply.

39. An automatic weighing-machine embodying the following coöperative elements, viz., a scale-beam, a load-receiver, stream-controlling means for first permitting, then shutting off, and afterward partially restoring, the flow of a stream of material, means for imparting to said stream-controlling means a movement controlling said first flow of the stream, and independent means for imparting to said stream-controlling means a movement controlling such partial flow and for shutting off the same.

40. An automatic weighing-machine embodying the following coöperative elements, viz., a counterpoised main scale-beam, a counterpoised auxiliary scale-beam pivoted on the poising side of said main scale-beam, a load-receiver pivoted on the poising side of said auxiliary scale-beam, stream-controlling means having two opening movements controlling respectively a main supply and a drip-supply, means controlled by the main scale-beam for actuating said stream-controlling means to deliver the main supply, and independent means for actuating said stream-controlling means to deliver the drip-supply.

41. An automatic weighing-machine embodying the following coöperative elements, viz., a counterpoised main scale-beam, a counterpoised auxiliary scale-beam pivoted on the poising side of said main scale-beam, a load-receiver pivoted on the poising side of said auxiliary scale-beam, stream-controlling means for delivering a main supply and a drip-supply and including a single stream-controlling member governing both of said supplies, means governed by the main scale-beam for controlling the main supply, a normally open electric circuit and independent means governed by the auxiliary scale-beam governing the closure of said circuit for controlling the drip-supply.

42. An automatic weighing-machine embodying the following coöperative elements, viz., a pair of load-receivers, a pair of separately-movable stream-controlling devices one for each load-receiver and each having opening and closing movements, and means including a source of power independent of that developed by the load for imparting an opening movement to one of said stream-controlling devices and a simultaneous closing movement to the other.

43. An automatic weighing-machine embodying the following coöperative elements, viz., a pair of scale-beams, a pair of load-receivers carried respectively thereby, a pair of stream-controlling devices one for each load-receiver and each having opening and closing movements, and electrical controlling means for governing an opening movement to one of said stream-controlling devices and a simultaneous closing movement of the other.

44. An automatic weighing-machine embodying the following coöperative elements, viz., a pair of scale-beams, a pair of load-receivers carried respectively thereby, a pair of stream-controlling devices one for each load-receiver and each having opening and closing movements, and electrical controlling means, including a lever coöperative at its ends with said stream-controlling devices, for governing an opening movement of one of said devices and a simultaneous closing movement of the other.

45. An automatic weighing-machine embodying the following coöperative elements, viz., a pair of scale-beams, a pair of load-receivers carried respectively thereby, a pair of stream-controlling devices one for each load-receiver and each having opening and closing movements, electrical controlling means for governing an opening movement of one of said stream-controlling devices and a simultaneous closing movement of the other, and independent means for imparting another opening movement to each of said stream-controlling devices.

46. An automatic weighing-machine embodying the following coöperative elements, viz., stream-controlling means, a scale-beam, a load-receiver, means for controlling the discharging of said load-receiver, a tripping device, means governed by said stream-controlling means and including an independent source of power, for shifting said tripping device into operative relation with said discharge-controlling means.

47. An automatic weighing-machine embodying the following coöperative elements, viz., stream-controlling means, a scale-beam, a load-receiver, a closer, a holding device for said closer, a tripping device, means governed by said stream-controlling means and including an independent source of power, for shifting said tripping device into operative relation with said holding device.

48. An automatic weighing-machine embodying the following coöperative elements, viz., stream-controlling means having a shut-off movement, a scale-beam, a load-receiver, means for controlling the discharging of said load-receiver, a tripping device, means governed by said stream-controlling means and including an independent source of power, for shifting said tripping device into operative relation with said discharge-controlling means on said shut-off movement.

49. An automatic weighing-machine embodying the following coöperative elements, viz., stream-controlling means having a shut-off movement, a scale-beam, a load-receiver, means for controlling the discharging of said load-receiver, a tripping device normally out of operative relation with said discharging means and coacting with said stream-controlling means, and means governed by said stream-controlling means, and including an independent source of power, for shifting said tripping device into operative relation with said discharge-controlling means on said shut-off movement.

50. A duplex automatic weighing-machine embodying the following coöperative elements, viz., a pair of counterpoised load-receivers, stream-controlling means, separate means for controlling the discharging of said load-receivers respectively, a tripping device coöperative separately with said discharge-controlling means, and means governed by said stream-controlling means and including an independent source of power for actuating said tripping device.

51. A duplex automatic weighing-machine embodying the following coöperative elements, viz., a pair of counterpoised load-receivers, a pair of stream-controlling devices one for each load-receiver, separate means for controlling the discharging of said load-receivers respectively, and a tripping device coöperative alternately with said discharge-controlling means and governed by said stream-controlling devices.

52. A duplex automatic weighing-machine embodying the following coöperative elements, viz., a pair of counterpoised load-receivers, a pair of stream-controlling devices one for each load-receiver, and each having a shut-off movement, separate means for controlling the discharging of said load-receivers respectively, and a tripping device governed alternately by said stream-controlling devices and shiftable into operative relation with said discharge-controlling means alternately on said shut-off movement.

53. A duplex automatic weighing-machine embodying the following coöperative elements, viz., a pair of counterpoised load-receivers, stream-controlling means, a pair of closers one for each load-receiver, a pair of holding devices for said closers, and a tripping device coöperative alternately with said holding devices and governed by said stream-controlling means.

54. A duplex automatic weighing-machine embodying the following coöperative elements, viz., a pair of counterpoised load-receivers, separate means for controlling the discharging of said load-receivers respectively, a tripping device and independent power means for causing said tripping device to coöperate separately with said discharge-controlling means.

55. A duplex automatic weighing-machine embodying the following coöperative elements, viz., a pair of counterpoised load-receivers, separate means for controlling the discharging of said load-receivers respectively, a tripping device, and independent power means for shifting said tripping device into and out of operative relation with said discharge-controlling means alternately.

56. A duplex automatic weighing-machine embodying the following coöperative elements, viz., stream-controlling means, a pair of counterpoised load-receivers, separate means for controlling the discharging of said load-receivers respectively, a tripping device coöperative separately with said discharge-controlling means, and means governed by said stream-controlling means and including an independent source of power, for actuating said tripping device.

57. A duplex automatic weighing-machine embodying the following coöperative elements, viz., a pair of counterpoised load-receivers, a pair of closers one for each load-receiver, a pair of holding devices for said closers, a tripping device and independent power means for causing said tripping device to coöperate separately with said holding devices.

58. A duplex automatic weighing-machine embodying the following coöperative elements, viz., a pair of counterpoised load-receivers, a pair of closers one for each load-receiver, a pair of holding devices for said closers, a tripping device and independent power means for causing said tripping device to coöperate alternately with said holding devices.

59. A duplex automatic weighing-machine embodying the following coöperative elements, viz., a pair of counterpoised load-receivers, a pair of closers one for each load-receiver, a pair of holding devices for said closers, a tripping device, and independent power means for shifting said tripping device into and out of operative relation with said holding devices alternately.

60. A duplex automatic weighing-machine embodying the following coöperative elements, viz., stream-controlling means, a pair of counterpoised load-receivers, a pair of closers one for each load-receiver, a pair of holding devices for said closers, and a tripping device coöperative separately with said holding devices and governed by said stream-controlling means.

61. A duplex automatic weighing-machine embodying the following coöperative elements, viz., a pair of stream-controlling devices, a pair of counterpoised load-receivers supplied respectively by said stream-controlling devices, a pair of closers one for each load-receiver, a pair of holding devices for said closers, a tripping device coöperative separately with said holding devices, and means governed by said stream-controlling devices for shifting said tripping device into and out of operative relation with said holding devices alternately.

62. In an automatic weighing-machine, the combination with a scale-beam, a load-receiver carried thereby and stream-supplying means, of a combined stream-reducing and cut-off device movable in the direction of the flow of the stream and automatic means for moving said device independently of the load-receiver.

63. In an automatic weighing-machine, the combination with a scale-beam, a load-receiver carried thereby and stream supplying and controlling means having coacting cut-off faces, for forming and cutting off a hollow supply-stream, of automatic means for moving one of said cut-off faces independently of the load-receiver.

64. In an automatic weighing-machine, the combination with a scale-beam, a load-receiver carried thereby and stream supplying and controlling means having coacting cut-off faces for forming and cutting off a hollow supply-stream, of automatic means for moving one of said cut-off faces independently of the load-receiver.

65. In an automatic weighing-machine, the combination with a scale-beam, a load-receiver carried thereby and stream supplying and controlling means having coacting cut-off faces defined by like figures for forming and cutting off a hollow supply-stream, of automatic means for moving one of said cut-off faces independently of the load-receiver.

66. In an automatic weighing-machine, the combination with a scale-beam, a load-receiver carried thereby and stream supplying and controlling means having coacting cut-off members one of which is tubular and one of which is movable substantially in the direction of the axis of such tubular member, of automatic means for shifting said movable cut-off member independently of the load-receiver.

67. In an automatic weighing-machine, the combination with a scale-beam, a load-receiver carried thereby and stream supplying and controlling means having coacting cut-off members one of which is tubular and the other of which is conical and one of which is also movable relatively to the other of automatic means for shifting said movable cut-off member independently of the load-receiver.

68. In an automatic weighing-machine, the combination with a scale-beam, a load-receiver carried thereby and stream supplying and controlling means having coacting cut-off members one of which is tubular and the other of which is conical and one of which is also movable substantially in the direction of the axis of such tubular member, of automatic means for shifting said movable cut-off member independently of the load-receiver.

69. In an automatic weighing-machine, the combination with a scale-beam, a load-receiver carried thereby and stream supplying and controlling means having coacting cut-off members one of which is tubular and has a cut-off movement in the direction of the flow of the stream, of automatic means for moving said tubular cut-off member independently of the load-receiver.

70. In an automatic weighing-machine, the combination with a scale-beam, a load-receiver carried thereby and stream supplying and controlling means having coacting cut-off members one of which is tubular and has a cut-off movement in the direction of the flow of the stream and the other of which is conical, of automatic means for moving said tubular cut-off member independently of the load-receiver.

71. In an automatic weighing-machine, the combination with a scale-beam, a load-receiver carried thereby and stream supplying and controlling means having coacting cut-off members one of which is tubular and has a cut-off movement in the direction of the flow of the stream and the other of which is conical and is fixed in the path of flow of the stream, of automatic means for moving said tubular cut-off member independently of the load-receiver.

72. In an automatic weighing-machine, the combination with a scale-beam and with a load-receiver carried thereby, of a supply-spout, a tubular stream-controller movable lengthwise of said supply-spout, a second stream-controller coöperative with said tubular stream-controller, and automatic means for moving said tubular stream-controller independently of the load-receiver.

73. In an automatic weighing-machine, the combination with a scale-beam and with a load-receiver carried thereby, of a supply-spout, a tubular gravitative stream-controller mounted on said supply-spout, a second stream-controller coöperative with said tubular stream-controller, and automatic means for moving said tubular stream-controller independently of the load-receiver.

74. In an automatic weighing-machine, the combination with a scale-beam, a load-receiver carried thereby, of a supply-spout, a tubular stream-controller movable lengthwise of said supply-spout, a stream-deflecting stream-controller coöperative with said tubular stream-controller, and automatic means for moving said tubular stream-controller independently of the load-receiver.

75. In an automatic weighing-machine, the combination with a scale-beam, a load-receiver carried thereby, of a supply-spout, a tubular stream-controller movable lengthwise of said supply-spout, a conical stream-controller coöperative with said tubular stream-controller, and automatic means for moving said tubular stream-controller independently of the load-receiver.

76. In an automatic weighing-machine, the combination with a scale-beam, and with a load-receiver carried thereby, of a supply-spout, a tubular stream-controller movable lengthwise of said supply-spout, a conical stream-controller disposed in the path of flow of the stream and in fixed relation with said supply-spout, and automatic means for moving said tubular stream-controller independently of the load-receiver.

77. An automatic weighing-machine embodying the following coöperative elements, viz., a scale-beam, a counterpoised load-receiver carried thereby, a supply-spout, a tubular stream-controller having opening and closing movements corresponding to movements of the load-receiver, and automatic means for moving said tubular stream-controller independently of the load-receiver.

78. An automatic weighing apparatus embodying the following coöperative elements, viz., a counterpoised load-receiver, a supply-spout, a tubular stream-controller movable relatively to the load-receiver, and means for shifting said stream-controller to three positions controlling respectively the main supply, the drip-supply, and the cut-off of the stream.

79. An automatic weighing-machine embodying the following coöperative elements, viz., a counterpoised load-receiver, a tubular stream-controller movable to main supply, cut-off, and drip-supply positions, the first two of which movements are controlled by the movements of said load-receiver, and separate automatic means for moving said stream-controller to said drip-supply position.

80. An automatic weighing apparatus embodying the following coöperative elements, viz., a counterpoised main scale-beam adapted to be poised by the main supply, a counterpoised auxiliary scale-beam pivoted on the poising side of said main scale-beam and adapted to be poised by the drip-supply, a load-receiver pivoted on the poising side of said auxiliary scale-beam, a supply-spout movable relatively to the load-receiver, a tubular stream-controller, and means for shifting said stream-controller to three positions controlling respectively the main supply, the drip-supply, and the cut-off of the stream.

81. An automatic weighing-machine embodying the following coöperative elements, viz., a counterpoised main scale-beam adapted to be poised by the main supply, a counterpoised auxiliary scale-beam pivoted on the poising side of said main scale-beam and adapted to be poised by the drip-supply, a load-receiver pivoted on the poising side of said auxiliary scale-beam, a supply-spout, a tubular stream-controller movable to main supply, shut-off, and drip-supply positions, the first two of which movements are controlled respectively by the counterpoising and poising movements of the main scale-beam, and separate means for moving said stream-controller to its drip-supply position.

82. A duplex automatic weighing-machine embodying the following coöperative elements, viz., a pair of counterpoised load-receivers, a pair of supply-spouts, a pair of tubular stream-controllers coöperative respectively with said respective supply-spouts, means governed by each of said load-receivers for shifting its own stream-controller to two positions controlling respectively the main supply and the cut-off of the stream, and means governed by each of said load-receiver for shifting the stream-controller of the other load-receiver to a position controlling the drip-supply.

83. A duplex automatic weighing-machine embodying the following coöperative elements, viz., a pair of counterpoised main scale-beams each adapted to be poised by its main supply, a pair of counterpoised auxiliary scale-beams each pivoted on the poising side of its respective main scale-beam and adapted to be poised by its drip-supply, a pair of load-receivers each pivoted on the poising side of its respective auxiliary scale-beam, a pair of supply-spouts one for each load-receiver, a pair of tubular stream-controllers coöperative respectively with said respective supply-spouts, means governed by each main scale-beam for shifting the stream-controller of its own load-receiver to two positions controlling respectively the delivery and shut-off of its main supply, and means governed by each auxiliary scale-beam for shifting the stream-controller of the other load-receiver to a position controlling the delivery of the drip-supply of said other load-receiver.

84. A duplex automatic weighing-machine embodying the following coöperative elements, viz., a pair of counterpoised main scale-beams each adapted to be poised by its main supply, a pair of counterpoised auxiliary scale-beams each pivoted on the poising side of its respective main scale-beam and adapted to be poised by its drip-supply, a pair of load-receivers each pivoted on the poising side of its respective auxiliary scale-beam, a pair of supply-spouts one for each load-receiver, a pair of tubular stream-controllers coöperative respectively with said respective supply-spouts, means governed by each main scale-beam for controlling the shifting of the stream-controller of its own load-receiver to two positions controlling respectively the delivery and shut-off of its main supply, and means governed by each auxiliary scale-beam for shifting the stream-controller of the other load-receiver to a position controlling the delivery of the drip-supply of said other load-receiver and for shifting the stream-controller of its own load-receiver to a position controlling the shut-off of the drip-supply from its own load-receiver.

85. An automatic weighing-machine embodying the following coöperative elements, viz., a counterpoised load-receiver, a supply-spout, a tubular stream-controller movable relatively to the load-receiver to stream-supplying and cut-off positions, a cut-off plate for closing the delivery end of the stream-controller when the latter is in the cut-off position and means for latching said tubular stream-controller in the stream-supplying position and for releasing the same on the completion of a load.

86. An automatic weighing-machine embodying the following coöperative elements, viz., a counterpoised load-receiver, a supply-spout, a tubular stream-controller movable to three positions controlling respectively the main supply, the drip-supply, and the cut-off of the stream, and means for latching said stream-controller in its drip-supplying position and for releasing the same on the completion of a load.

87. An automatic weighing-machine embodying the following coöperative elements, viz., a counterpoised main scale-beam adapted to be poised by the main supply, a counterpoised auxiliary scale-beam pivoted on the poising side of said main scale-beam and adapted to be poised by the drip-supply, a load-receiver pivoted on the poising side of said auxiliary scale-beam, a supply-spout, a tubular stream-controller movable to three positions controlling respectively the main supply, the drip-supply and the cut-off of the stream, and means for latching said stream-controller in its drip-supplying position clear of the scale-beams after the main scale-beam has been poised and for releasing the stream-controller on the poising of the auxiliary scale-beam.

88. A duplex automatic weighing-machine embodying the following coöperative elements, viz., a pair of counterpoised load-receivers, a pair of supply-spouts, a pair of duplex stream-controllers coacting respectively with said respective supply-spouts and each movable to three positions controlling respectively the main supply, the drip-supply and the cut-off of its stream, and means for latching each of said stream-controllers in its drip-supplying position on the completion of the load in the other load-receiver and for releasing each stream-controller on the completion of the load in its own load-receiver.

89. An automatic weighing-machine embodying the following coöperative elements, viz., a counterpoised scale-beam, a load-receiver carried by said scale-beam and having a closer, a steam-controller having an opening movement governed by the counterpoising movement of said scale-beam, a latch for locking said scale-beam in its poised position, and a resilient tapper carried by the closer and operative for releasing said latch on the return of the closer to its shut position.

90. An automatic weighing-machine embodying the following coöperative elements, viz., a counterpoised main scale-beam adapted to be poised by the main supply, a counterpoised auxiliary scale-beam pivoted on the poising side of said main scale-beam and adapted to be poised by the drip-supply, a load-receiver pivoted on the poising side of said auxiliary scale-beam, stream-controlling means adapted to deliver a main supply and a drip-supply, the delivery of the former being governed by the counterpoising movement of the main scale-beam, and means for locking said main scale-beam to the framework during the delivery of the drip-supply.

91. An automatic weighing-machine embodying the following coöperative elements, viz., a counterpoised main scale-beam adapted to be poised by the main supply, a counterpoised auxiliary scale-beam pivoted on the poising side of said main scale-beam and adapted to be poised by the drip-supply, a load-receiver pivoted on the poising side of said auxiliary scale-beam, stream-supplying means adapted to deliver a main supply and a drip-supply, the delivery of the former being governed by the counterpoising movement of the main scale-beam, and means for locking said main scale-beam to the framework at the end of its poising movement and during the delivery of the drip-supply.

92. An automatic weighing-machine embodying the following coöperative elements, viz., a counterpoised main scale-beam adapted to be poised by the main supply, a counterpoised auxiliary scale-beam pivoted on the poising side of said main scale-beam and adapted to be poised by the drip-supply, a load-receiver pivoted on the poising side of said auxiliary scale-beam, stream-controlling means adapted to deliver a main supply and a drip-supply, the delivery of the former being governed by the counterpoising movement of the main scale-beam, and means for locking said main scale-beam to the framework during the delivery of the drip-supply and for releasing said scale-beam on the discharge of a load.

93. An automatic weighing-machine embodying the following coöperative elements, viz., a counterpoised main scale-beam adapted to be poised by the main supply, a counterpoised auxiliary scale-beam pivoted on the poising side of said main scale-beam and adapted to be poised by the drip-supply, a load-receiver pivoted on the poising side of said auxiliary scale-beam, a stream-controller having an opening movement governed by the counterpoising movement of the main scale-beam and also having a movement governed by said auxiliary scale-beam, and means for locking said main scale-beam in its poised position and for releasing said scale-beam on the discharge of a load.

Signed at Brooklyn, in the county of Kings and State of New York, this 28th day of November, A. D. 1904.

GEORGE F. TURNER.

Witnesses:
 JOHN H. JAMES,
 JOHN DIXON HARPER.

Signed at New York city, in the county of New York and State of New York, this 8th day of December, A. D. 1904.

CHARLES E. VAIL.

Witnesses:
 J. A. GRAVES,
 T. F. KEHOE.